United States Patent [19]
Bonnet et al.

[11] Patent Number: 5,995,741
[45] Date of Patent: Nov. 30, 1999

[54] SIMULATION TOOL FOR A NETWORKING CODE

[75] Inventors: Pascal Bonnet, Bougival; François Machet, Orsay; René Martin, Le Vesinet, all of France

[73] Assignee: Bull S.A., Paris, France

[21] Appl. No.: 08/143,130

[22] Filed: Oct. 29, 1993

[30]     Foreign Application Priority Data

Nov. 13, 1992 [FR]  France ................................. 92 13653

[51] Int. Cl.$^6$ ................................................ G06F 17/50
[52] U.S. Cl. ............................... 395/500.42; 395/200.43
[58] Field of Search ................................... 395/500, 200, 395/325, 500.42, 500.43

[56]            References Cited

U.S. PATENT DOCUMENTS

| | | | |
|---|---|---|---|
| 4,430,699 | 2/1984 | Segarra et al. ........................ | 395/200 |
| 4,617,663 | 10/1986 | Lake et al. ............................ | 714/736 |
| 4,845,665 | 7/1989 | Heath et al. .......................... | 395/157 |

FOREIGN PATENT DOCUMENTS

| | | |
|---|---|---|
| 0327198 | 5/1989 | European Pat. Off. . |
| 9120032 | 12/1991 | WIPO . |
| 9215962 | 9/1992 | WIPO . |

OTHER PUBLICATIONS

Computer Design, vol. 21, No. 1, Jan. 1982, Littleton, Mass. USA, pp. 175–179—D.E. Wrege "Hosted Software for Microcomputers".

Microprocessing and Microprogramming, vol. 18, No. 1–5, 1986, Amsterdam NL, pp. 145–152, I. Chlamtac, "A Concurrent Network Simulator for Automated Protocol Development and Performance Evaluation".

Saver et al, "Queuling Network Simulations of Computer Communication" Jan. 1984 pp. 203–220.

Chlamtac et al. "A methodology for Building a Simulation Model for efficient . . . " Feb. 1984.

*Primary Examiner*—Zarni Maung
*Attorney, Agent, or Firm*—Kerkam, Stowell, Kondracki & Clarke, P.C.; Edward J. Kondracki

[57]                ABSTRACT

A simulation tool (ES) for a networking code (RE), characterized in that the code is carried in a computer (ORD) external to the system, the tool constituting an application for the operating system (NY) of the computer by being considered to be a virtual core (CC), and including at least the communications layer code, unmodified and compiled in the internal language of the computer (CC); the basic services for the virtual core, which are connected to said code (CONFIG, RA, SI, GH); a number (m) of libraries ($L_1$–$L_m$) for access to the code (CC) for a number (n) of test applications ($A_1$–$A_n$) of the latter code. The tool has particular utility in debugging networking codes.

9 Claims, 4 Drawing Sheets

SIMULATION TOOL FOR A NETWORKING CODE

FIELD OF THE INVENTION

The present invention relates to a tool for simulating a code of communications layers of a network, which for simplicity will be called a networking code hereinafter. It is applicable in particular to the simulation of a code that can be executed by an information processing system processor that handles the exchanges of information between the various stations of a network, an example of this network being an FDDI-type network (standardized by ANSI as No. X3T9-5 and by the International Standards Organization or ISO).

BACKGROUND OF THE INVENTION

It is known that communications networks are constituted by a plurality of terminals for stations, connected to one another by a transmission link that includes a transmission medium, which by way of example may be constituted of optical fibers, in the case of an FDDI-type network. A computer connected to such a network is considered to be a terminal.

Many modern remote information processing and telematics networks function by the same reference model, known as the OSI reference model. Other networks may also operate by different models, which however remain similar to the OSI reference model in terms of the definition of the architecture of these networks in the form of standardized layers (TCP-IP networks are one example of this). Hence in the OSI model, the architecture is constituted by a stack of seven activity layers, with the lowest layer (layer 1) corresponding to the physical transmission of signals among the various systems, through the physical interconnection medium (optical fibers), while the uppermost layer (layer 7) corresponds to the functions performed by the applications programs and the users of the remote information processing network in question.

The OSI model also defines the concepts by which the function of each layer can be described. Devices are also known that define the relations among adjacent layers, such as the one by AT&T known as "STREAMS" and defined more precisely in the documents mentioned hereinafter.

In the industrial development of networks, the trend is to use more and more terminals, which has led to the development of programmed communications processors in the very heart of the computers, which by performing some of the handling of the communications of the computer with the other stations of the network, make it possible to reduce the load on the central processing unit of the computer.

Moreover, given the extremely rapid development of communications networks and of information processing systems, there is a need for computers of different types, using different operating systems, to be connected to the same network.

The purpose of a communications processor, which may also be called a data transmission system or gateway connection device, is to adapt the conditions of transmission of the information on the bus of a computer to the conditions of transmission in the network, where these transmission conditions are completely different. Moreover, this communications processor makes dialog possible among the operating systems of different computers. In particular, it enables dialog between the various communications layers of the operating system of a first computer and the various communications layers of the operating systems of different computers connected to the same network.

Accordingly, in the very heart of its operating system, the communications processor must include a code of communications layers that enables it to carry out dialog both with the operating system of the computer to which it is connected and with the other computers connected to the network, which for example is of the FDDI type.

An example of such communications processor, also known as a data transmission system, is described hereinafter.

Such a communications processor, known as NCC, makes it possible to assure handling of the data transfer between a host computer HOST, which is provided with an internal bus PSB and whose operating system is designated by the abbreviation OS, and a network RE, for example of the FDDI type. By way of example, the bus PSB is a bus known as MultibusII (trademark registered by Intel), standardized under IEEE (Institute of Electrical and Electronic Engineers) Standard 1296.

The NCC communications processor includes three essential parts, which are as follows:

The first part, called GPU (for General Purpose Unit), is for example the model described in U.S. patent application Ser. No. 07/913,477, filed Jul. 15, 1992, entitled "Universal Device for Coupling a Computer Bus to a Controller for a Group of Peripherals", now U.S. Pat. No. 5,367,646. This part is provided with an operating system, for example, of the type described in U.S. patent application Ser. No. 07/913,366, filed on Jul. 15, 1992, entitled "Operating System for Universal Device for Coupling a Computer Bus to a Specific Link of a Network", now U.S. Pat. No. 5,455,950. The purpose of this GPU part is to assure on the one hand the initialization of the entire NCC coupler, and on the other to assure the dialog with the host computer by way of the bus PSB, while meeting the standards for use of this bus and conforming to the nature of the operating system OS of the host computer. Moreover, the GPU part assures the physical transfer of the data between the bus PSB and the second part or adaptor device DEA, which is directly connected to the network RE. The function of this part DEA is described below.

The hardware of the part DEA is, for example, of the type described French Patent 2 650 412, entitled "dispositif passerelle de connexion d'un bus d'ordinateur à un réseau fibre optique en forme d'anneau" (gateway device for connecting a computer bus to a fiber optical network in the form of a ring and the software is of the type described in French Patent Application 92 11054. This DEA part assures the physical transmission of the data between the GPU part and the network RE, as well as the physical connection to the network.

The third part, called PPA, is in fact a communications coprocessor intended, more particularly, for handling the various telecommunications layers of the OSI model, or of the TCP-IP model. Both with respect to the OSI model and the TCP-IP model, the part PPA assures the handling of the communications layers $C_4$, $C_3$, $C_2$, or in other words the transport, network and data link layers, respectively.

Communications layers $C_2$–$C_4$ communicate with one another by way of primitive functions that enable two neighboring layers to carry out a dialog between them. Thus the two layers $C_2$ and $C_3$ communicate between one another by way of the set of functions $ST_2$, while the layers $C_3$ and $C_4$ communicate by way of the set of functions $ST_3$. In addition, $C_4$ communicates with the outer world, for example with external applications, by way of an interface SH.

In a preferred embodiment of the invention, the sets of functions $ST_2$, $ST_3$, SH are functions known in current practice as STREAMS. These standard functions are defined for example in the following documents:

UNIX System V, release 4—STREAMS Programmer's Guide, AT&T Issue No. 1.

UNIX System V, release 3.2—STREAMS Programmer's Guide, AT&T (ISBN: 0-13-944810-1): 1989

In the exemplary embodiment shown in FIG. 1, when the host computer sends a message to the network RE, or when a message originates in the network RE, the message passes through the layers $C_2$–$C_4$, by way of a FIFO $FF_1$, while this message is transmitted in the first case to the adaptor device DEA or in the second case to the GPU, from the part PPA by way of the FIFO memory $FF_2$. When a request for connection, originating in the host computer, is to be made, the request passes by way of the interface SH. Once the connection is made, whether it involves sending messages to all or some of the stations connected to the network, these messages pass directly into the layers $C_4$–$C_2$.

The set constituted by the communications layers $C_2$–$C_4$ and by the various functions $ST_2$, $ST_3$ and SH, as well as by the associated operating system (that of the part PPA), makes up what is known as a communications layer code CC, or networking code, or communications core.

In current practice, when communications processors such as NCC are checked out, it is necessary to wait until the hardware support is achieved before the networking code can be checked out, which results in a loss of time in the development process.

SUMMARY OF THE INVENTION

The present invention makes it possible to overcome these disadvantages by carrying the communications core CC on an external computer and considering this core to be an application for the operating system of that machine.

According to the invention, the tool for simulating a communications layer code for access to a network, the code being executable in any information processing system communications processor that handles the exchanges of information in the network, is characterized in that the code is carried in a computer external to the system, the tool constituting an application for the operating system of the computer by being considered to be a virtual core, and including at least the following:

the communications layer code, unmodified and compiled in the internal language of the computer;

the basic services for the virtual core, which are connected to the code;

libraries for access to the code for all the test applications of this code.

Further characteristics and advantages of the present invention will become apparent from the ensuing description given by way of non-limiting example, in conjunction with the accompanying drawings, in which FIG. 1 depicts the various essential constituent elements of a communications processor;

DETAILED DESCRIPTION OF THE PREFERRED EMBODIMENT

Figure 2:
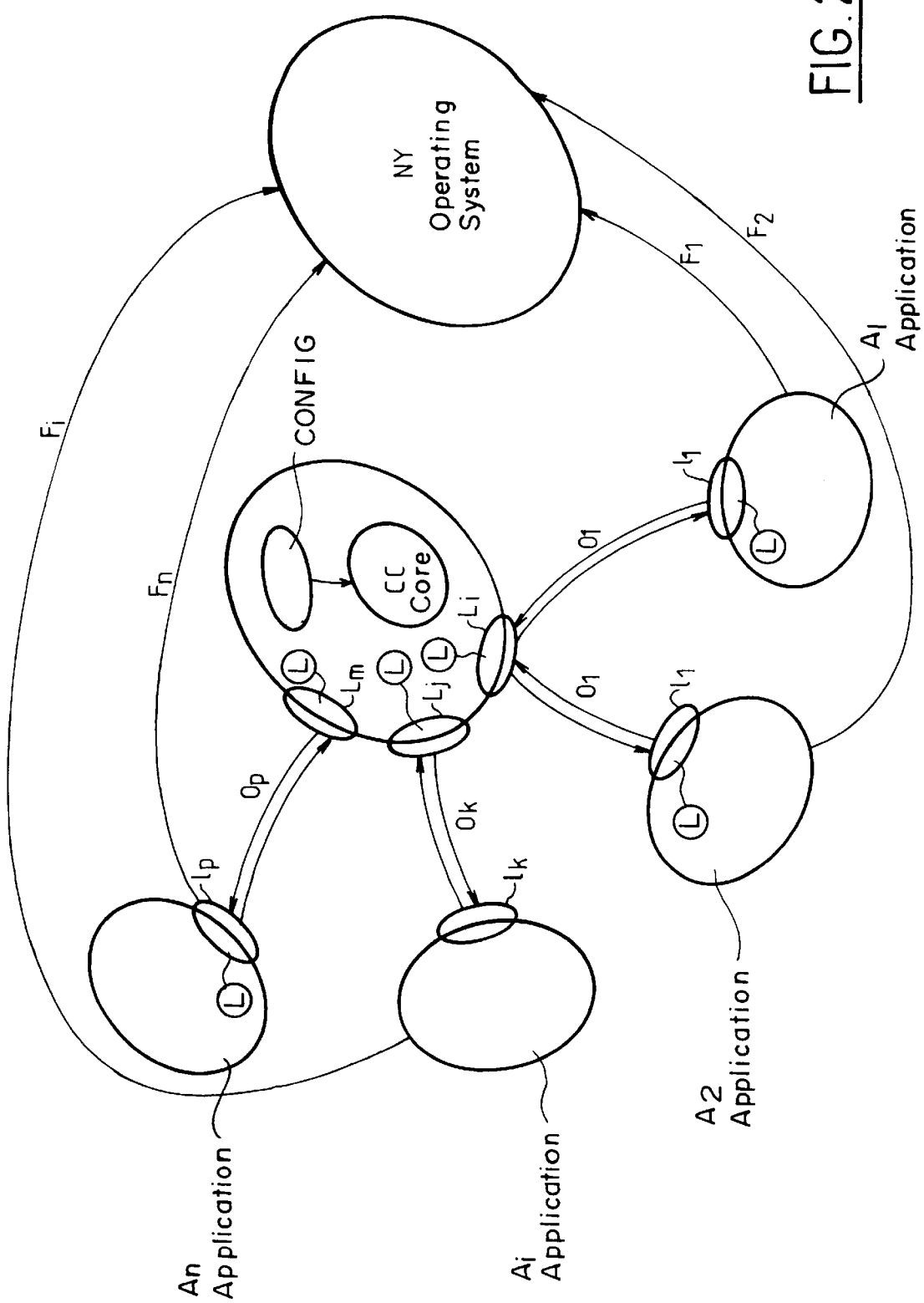
FIG. 2 shows the essential constituent elements of the simulation tool according to the invention.

Turning now to FIG. 2, the essential constituent elements of the simulation tool according to the invention are shown.

The simulation tool, which is more preferably called a "simulation environment" or ES, is carried on a machine called ORD, which is intended for instance for checking out software of various types, and whose operating system is called NY. In a preferred exemplary embodiment of the invention, both NY and ES function by the UNIX system, defined by AT&T and now widely used.

The simulation environment ES is considered by NY to be an application and is consequently located outside the operating system itself. Hence, if when the simulation environment ES is being checked out an error occurs, the error will affect only this same application; consequently the machine ORD can continue to run with its operating system NY and can remain available for checking out other applications.

Figure 1:
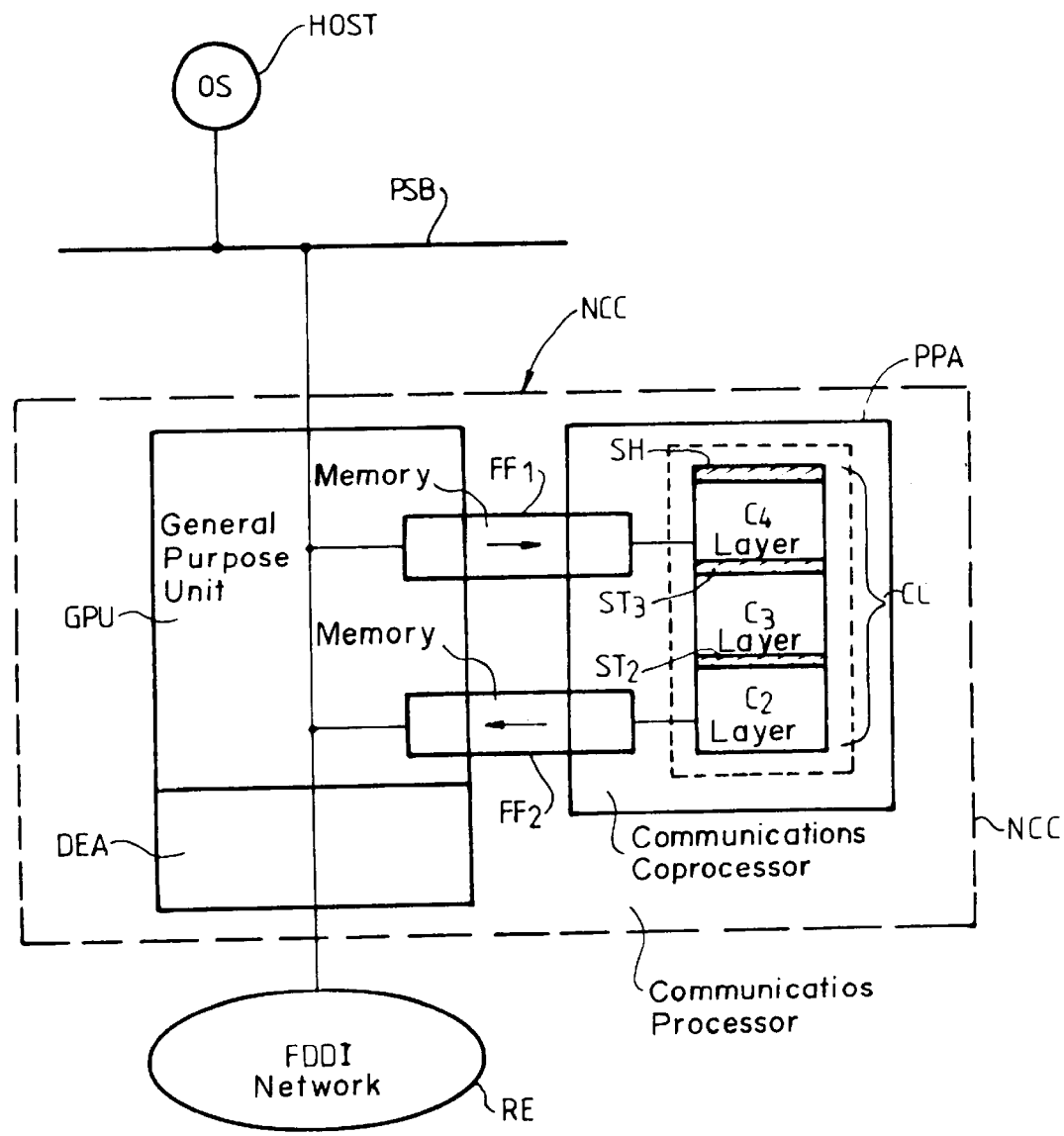

The simulation environment ES includes a central core CC which reproduces the communications layers, for example $C_2$–$C_4$ which are shown in FIG. 1. These communications layers CC include precisely the same lines of code as those involved in the part PPA of FIG. 1. The only difference is that these communications layers are compiled in the internal language specific to the machine ORD.

The communications layers included in CC are those that the user wants to simulate and test. They are of any arbitrary type, such as OSI, TCP-IP, LAP-D, and so forth. They may vary over time, since the user may have the need to check out networking codes of various types, depending on his needs at any particular moment. It is understood that at the same moment, the core CC may contain communications layers of different types, or no layers at all.

The environment ES also includes a configurator CONFIG, for starting up the core CC. The latter can communicate with the test applications $A_1, \ldots, A_i, \ldots, A_n$ that are external to ES, by way of respective applications libraries $L_1, L_j, \ldots, L_m$, which also belong to ES, and libraries $l_1, l_k, \ldots, l_p$ belonging to $A_1, A_i, \ldots, A_n$.

All these libraries ($L_1$–$L_m$, $l_1$–$l_p$) contain calling systems $O_1, \ldots, O_k, \ldots, O_p$ that meet the UNIX standard.

The number m of libraries in ES ($L_1$–$L_m$) is generally different from the number p of libraries $l_1$–$l_p$, which in turn is different from the number n of applications $A_1$–$A_n$.

In fact, a plurality of different applications, such as $A_1$ and $A_2$ in FIG. 2, may have identical libraries, in this case $l_1$, that communicate with the same library $L_1$, which defines the calling system $O_1$.

In FIG. 2, it has been assumed that $A_i$ has a library $L_k$ communicating with $L_j$, which defines the calling system $O_k$, while $A_n$ has the library $l_p$ communicating with the library $L_m$, which defines the calling system $O_p$.

In the case where an application $A_i$ seeks to communicate with the simulation environment ES by way of the calling system $O_k$, and where it receives no response from ES, the call is returned to the central operating system NY of the machine ORD, as indicated for example by the arrows $F_1, \ldots, F_i, \ldots, F_n$ in FIG. 2. This is the case, for example, when $A_i$ seeks to obtain the opening of a file, which CC does not do.

The simulation environment ES offers an environment for the following test applications:

the unitary test applications of STREAMS-type interfaces, where the term unitary means that one seeks to test a predetermined STREAMS interface;

unitary test applications of communications protocol layers, where the term unitary means that one seeks to test a predetermined layer;

test applications of a stack of layers, or in other words the applications for simulating the operation of a network.

The environment ES is configurable. Its core CC is started by the configurator CONFIG. It may be under the control of a debugger located in NY.

The environment ES furnishes dynamic access to all the test applications and makes the simulation transparent for the various layers of the core CC, since neither a single line of code of the core, nor a line of each of its applications, is touched.

The test applications can be launched either directly from a UNIX command language, which is represented in FIG. 2 by the various calling systems $O_1-O_p$, or by a standard UNIX-type applications debugger (arbitrary debugger, furnished by NY under UNIX, differing from that mentioned above).

Running a simulation of the code CC is known as a simulation session, and each of the test applications may be connected dynamically with a simulation session. Moreover, a plurality of simulation sessions can coexist simultaneously in the same environment ES.

Each of the system calls $O_1, \ldots, O_k, \ldots, O_p$ is in accordance with the semantics of a STREAMS system call in UNIX. In other words, it can be said that UNIX system calls are emulated in the simulation environment ES, or that the applications $A_1-A_n$ communicate with the simulation environment ES as if a genuine UNIX system were involved.

Figure 3:
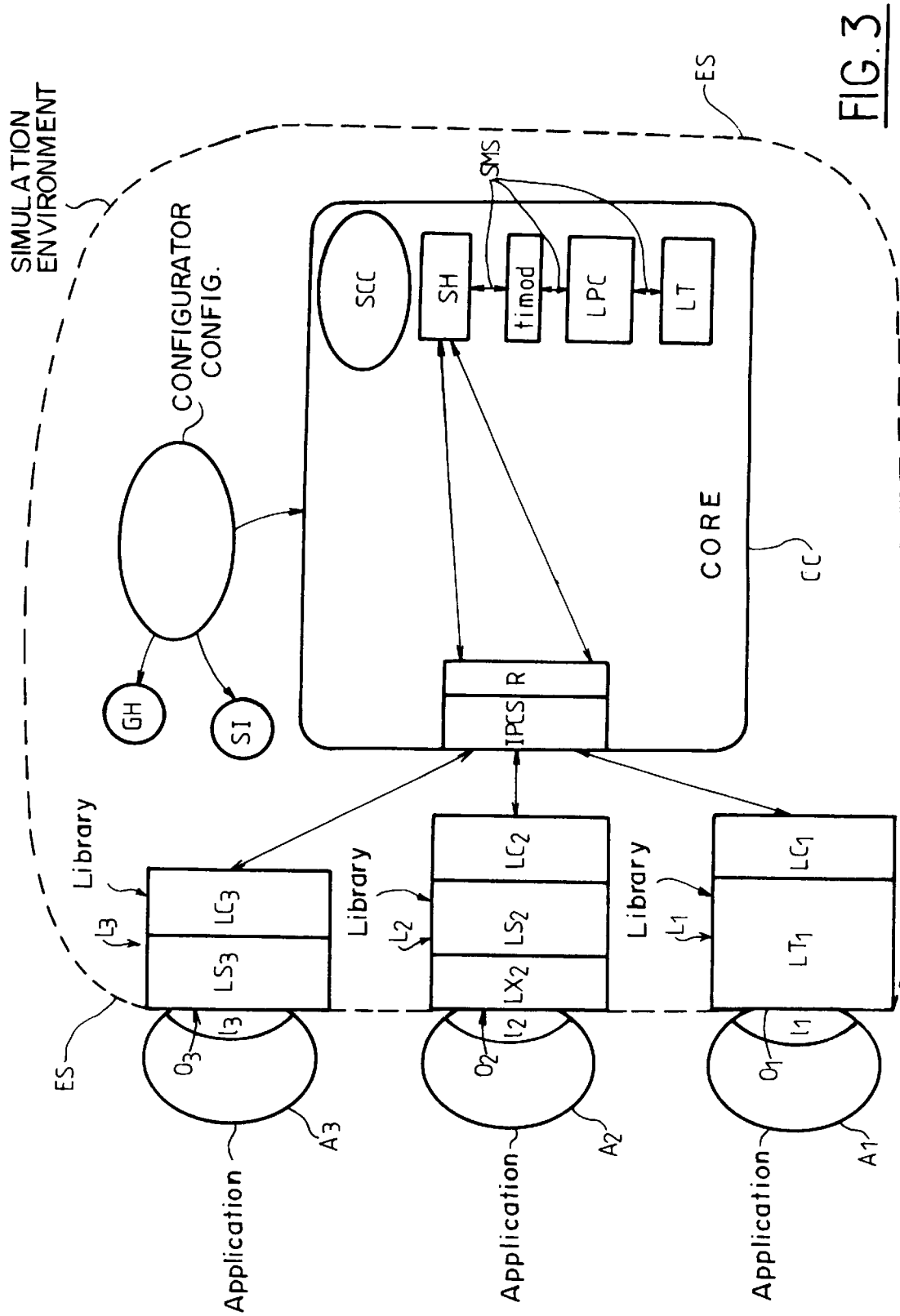
FIG. 3 shows, in more detail, an embodiment of the invention in which the essential constituent elements shown in FIG. 2 relate to checking out a communications processor, which may use any arbitrary type of operating system.

Turning now to FIG. 3, a first exemplary embodiment of the simulation environment ES shown in FIG. 2 is shown. In this connection, it is assumed that there are three applications $A_1, A_2, A_3$.

The application $A_1$ is a network simulation application. It accordingly simulates messages originating in a network, messages which are in accordance with the applications protocol in this network.

The application $A_2$ is a test application for the standard XTI defined by AT&T. XTI is an interface standard between a level-4 layer (transport) and any arbitrary user application (Process User).

The application $A_3$ is a test application using the standard STREAMS system calls. It can accordingly be seen that these applications are either applications written specifically by the user, for example the application $A_1$, or standard UNIX applications, such as the applications $A_2$ and $A_3$.

The applications $A_1-A_3$ can assess a simulation session by way of specific libraries $L_1$, $L_2$ and $L_3$ that belong to ES. Here it is assumed that $A_1$, $A_2$, $A_3$ have respective libraries $l_1, l_2, l_3$, associated respectively with the calling systems $O_1$, $O_2$, $O_3$, and with the libraries $L_1$, $L_2$, $L_3$, for the sake of simplification. Each of these libraries furnishes the corresponding application with a set of functions that enable it to communicate with the virtual core CC. The dialog of the applications with the core is based on a UNIX mechanism, specifically an IPC mechanism. To that end, each of the libraries $L_1-L_3$ includes a sublibrary, $LC_1$, $LC_2$ and $LC_3$, respectively, known as IPC client libraries. This mechanism, which is transparent for the application, enables the user of it to identify the simulation system to which he wishes access. (It will be recalled that more than one session may take place simultaneously for the same virtual core CC.) The layer immediately above the IPC mechanism is an intermediate layer that makes the lower IPC-type layer invisible for the application. To that end, the two libraries $L_2$ and $L_3$ are each provided with a respective sublibrary, that is, $LS_2$ and $LS_3$, furnishing specific tests for the STREAMS interfaces, for example.

The library $L_2$ also includes a sublibrary $LX_2$, which is specific to the XTI test applications. In addition, the library $L_1$ includes a sublibrary $LT_1$, called a transparent library, which contains the means for access to the simulation environment ES making it possible to simulate messages originating from a particular predetermined type of network that one seeks to simulate.

The configurator CONFIG triggers the execution of the virtual core CC that one seeks to simulate. The latter is triggered like any arbitrary UNIX-type application. This configurator CONFIG also triggers service applications, specifically the clock manager GH and the interruption manager SI.

The configurator CONFIG reads its directives from a configuration file, where all the possible operations that one wishes to start during a simulation session are indicated.

The virtual core CC further includes a certain number of services, that is:

the applications connection services formed by the IPCS server (or IPC-type server, defined in UNIX), and a dispatcher R, enabling each application to find the point of entry through the communications core of CC to which it seeks access; depending on the type of communications layers that one seeks to check out, the entry points are in fact different.

the set of services SCC, which furnishes the basic operating system of the core CC.

services that simulate the hardware services, which are those used by the communications processor using the communications code CC that one seeks to simulate. These hardware services may be constituted for example by an interruption manager, which simulates hardware interruptions; a clock manager, which simulates timing functions; memory allocation services; and inhibition services.

STREAMS-type mechanism services SMS, defined by the standards relating to these same STREAMS.

The virtual core CC also includes a set of component elements that may be defined as a STREAMS-type architecture, these elements being as follows:

the STREAMS interface SH, which is strictly analogous to the interface SH of the set of communications layers of the part PPA of FIG. 1;

the timod element, which is a STREAMS module linked to XTI;

the set LPC of communications protocol modules that one seeks to test, at a given moment. At a different moment, this set may be of a different nature (TCP-IP, ISO, LAP-D, etc.). These modules are connected together in accordance with the orders provided in a code file in the C2+ language furnished by the user. These various modules are unaware of the fact that they are being executed in a simulation environment. Hence they behave exactly as if they were in a real environment.

a set LT of specific modules for each of the tests that one seeks to employ. They are linked to one another in the same way as the protocol modules LPC.

The elements listed above communicate with one another (arrows in heavy lines in FIG. 3) via streams services SMS (defined in the standard). Hence SH communicates with timod, timod with LPC, and LTC with LPC, by way of these services SMS.

Hence as can be seen in FIG. 3, the exchanges of information and the dialogs among the various constituent elements of the simulation environment take place in both directions, which is illustrated by the set of double-headed arrows connecting $L_3$, $L_2$, $L_1$ to CC, on the one hand, and between the dispatcher R and the STREAMS interface SH, on the other. It can also be seen that the communication between each of the applications $A_1$–$A_3$, by way of the libraries $l_1$–$l_3$, $L_1$–$L_3$ and via the server IPCS in the dispatcher R pass through the STREAMS interface SH. The dialog between SH and R also takes place in both directions, as illustrated by the two double-headed arrows inside the virtual core CC; these arrows symbolize the STREAMS and XTI tests on the one hand and the network simulation tests on the other.

Figure 4:
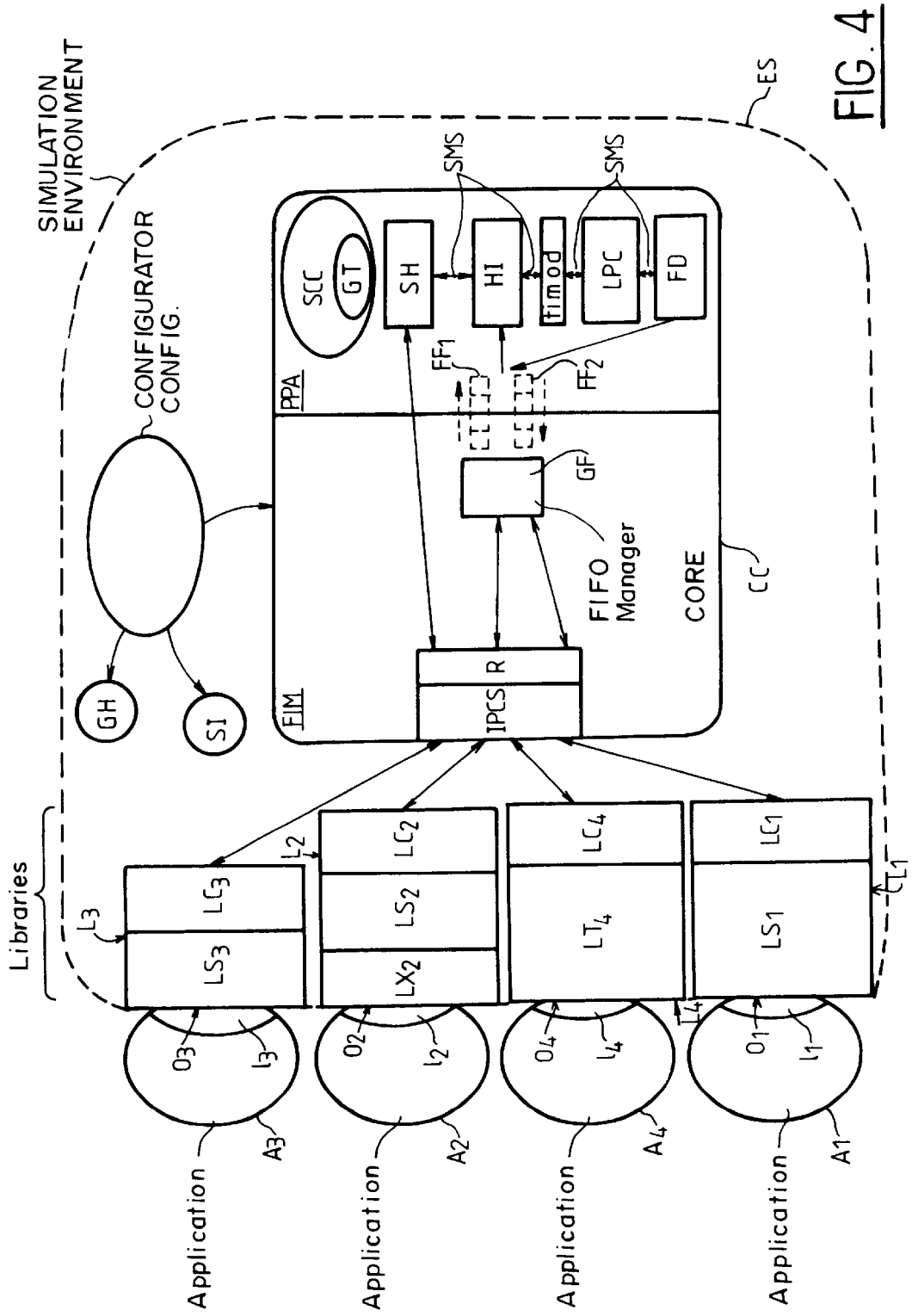
FIG. 4 shows a particular embodiment of the simulation tool according to the invention, which is more particularly applicable to checking out the code CC of the part PPA shown in FIG. 1.

FIG. 4 shows a particular exemplary embodiment of FIG. 3, more particularly intended to simulate the function of the communications code of the PPA element of FIG. 1.

The majority of the essential constituent elements of FIG. 3 is found in FIG. 4, that is, the applications $A_1$–$A_3$ with their corresponding libraries $L_1$–$L_3$, and the essential constituent elements of the communications code CC, that is, the server IPCS, the dispatcher R, the virtual core service SCC, the STREAMS interface SH, the timod element, and the set LPC. The simulation environment shown in FIG. 4 also includes an application $A_4$, called a host application, accompanied by the libraries associated with it, that is, its own library $l_4$ on the one hand and $L_4$ for ES, composed of a sublibrary $LC_4$ similar to the sublibraries $LC_1$–$LC_3$, and a transparent library $LT_4$ simulating the messages that the host computer can send to the network RE, by way of the parts GPU, PPA and DEA shown in FIG. 1. In addition, the virtual core CC includes a FIFO manager and two FIFOs $FF_1$ and $FF_2$, which very precisely simulate the FIFOs $FF_1$ and $FF_2$ having the same name in FIG. 1. In FIG. 4, the virtual core CC also includes an interface $OH_1$ placed between the STREAMS interface SH and the timod element.

In addition, the virtual core CC of FIG. 4 includes a FIFO writing software FD.

The elements SH, HI, timod, LPC and FD communicate among one another respectively by way of streams services SMS analogous to those of FIG. 3. In addition, the FIFO writing software FD communicates directly with the FIFO element $FF_2$, while the element $FF_1$ communicates directly with the host interface HI.

The applications $A_1$ and $A_4$ communicate with the virtual core CC by way of the libraries $l_1$ and $l_4$, $L_1$ and $L_4$ of the IPC and R elements (in the same manner as in FIG. 3), which in turn communicate directly with the FIFO manager GF. Conversely, how the applications $A_2$ and $A_3$ communicate with the virtual core CC is entirely identical to what is shown in FIG. 3. Consequently, in this case, the dispatcher R communicates directly with the STREAMS interface SH.

In addition, the virtual core services SCC also include a task manager GT, which includes functionalities specific to the operating system that is actually employed in the element PPA. In the exemplary embodiment described here, these functionalities belong to the communications software CNS developed by the present applicant.

The other elements CONFIG, GH, SI, RA are strictly identical to those of FIG. 3.

The host interface HI is a multiplexer whose role is to extract messages from the reading FIFO $FF_1$. These messages transport primitives of a specific format to this processor NCC. Certain ones of these messages are addressed either through the interface SH to a connection queue-type task CMS, or are addressed to the LPCs.

Hence as has been noted above, the writing software FD writes messages in the writing FIFO $FF_2$.

The communications protocol programs LPC function in the same manner as in FIG. 3, or are chained by a configuration task defined by the configuration messages received from the application $A_4$ when this application is simulated.

While the several aspects and embodiments of the invention have been illustrated and described, it will be apparent to those of ordinary skill in the art that various changes and modifications may be made without deviating from the inventive concepts and spirit of the present invention, and it is intended by the appended claims to define all such changes and modifications which come within the full scope and true spirit of the invention.

We claim:

1. A tool (ES) for simulating the operation of a communications layer code (CC) which is executable in an information processing system communications processor (NCC) adapted to send and receive data to and from at least one network, said communications layer code running on a computer (ORD) which is external to the information processing system and having an operating system (NY) and an internal language, said tool comprising:

basic services for the communications layer code for configuring the tool and enabling autonomous operation of the tool with respect to said operating system;

a first and at least a second set of tool libraries, the first set of tool libraries (L1–LM) being accessed from the communications layer code, wherein the communications layer code corresponds with test applications of communications layers and of network operations external to the tool through said first set of tool libraries cooperating with the second set of libraries (l1–lp) which is associated with said test applications; and wherein said communications layer code is compiled in said internal language of the computer and represents a virtual core for the tool, and further wherein said tool is an application for said operating system.

2. The simulation tool of claim 1, wherein each of said test applications include an application library capable of communicating with one of said tool libraries by defining therewith a calling system, wherein a number (p) of different applications libraries is equal to or less than the number (m) of tool libraries, and further wherein a plurality of said applications have identical applications libraries, and further including a number (p) of different calling systems.

3. The communications tool of claim 2, wherein said calling systems are in accordance with the UNIX system, and interfaces are provided between said communications layers, said interfaces being STREAMS-type interfaces.

4. The simulation tool of claim 2, wherein said test applications include the following:

test applications of predetermined interfaces among different communications layers of the network ($A_2$, $A_3$);

test applications for each communications layer of said communications layer code; and test applications ($A_1$) for a stack of communications layers.

5. The simulation tool of claim 1, wherein said test applications include the following:

test applications of predetermined interfaces among different communications layers of the network ($A_2$, $A_3$);

test applications for each communications layer of said communications layer code; and test applications ($A_1$) for a stack of communications layers.

6. The simulation tool of claim 5, wherein each tool library ($L_1$–$L_3$) includes a first sublibrary ($LC_1$, $LC_2$, $LC_3$) including means for enabling a user of said tool to select a desired simulation session, a plurality of simulation sessions being capable of coexisting in said tool, and a second sublibrary containing specific tests of interfaces among communications layers of said communications layer code.

7. The simulation tool of claim 6, wherein every tool library ($L_1$) further includes means for accessing simulated messages which simulate messages originating in the network, said simulated messages being stored in a sublibrary.

8. The communications tool of claim 5, wherein said calling systems are in accordance with the UNIX system, and interfaces are provided between said communications layers, said interfaces being STREAMS-type interfaces.

9. The simulation tool of claim 1, wherein said basic services include a configurator that triggers execution of said tool.

* * * * *